July 23, 1935. C. GUSEO ET AL 2,009,177
REEL FOR MAKING AUTOMATICALLY TIED UP OR CROSSED HANKS
Filed Feb. 8, 1933 4 Sheets-Sheet 3
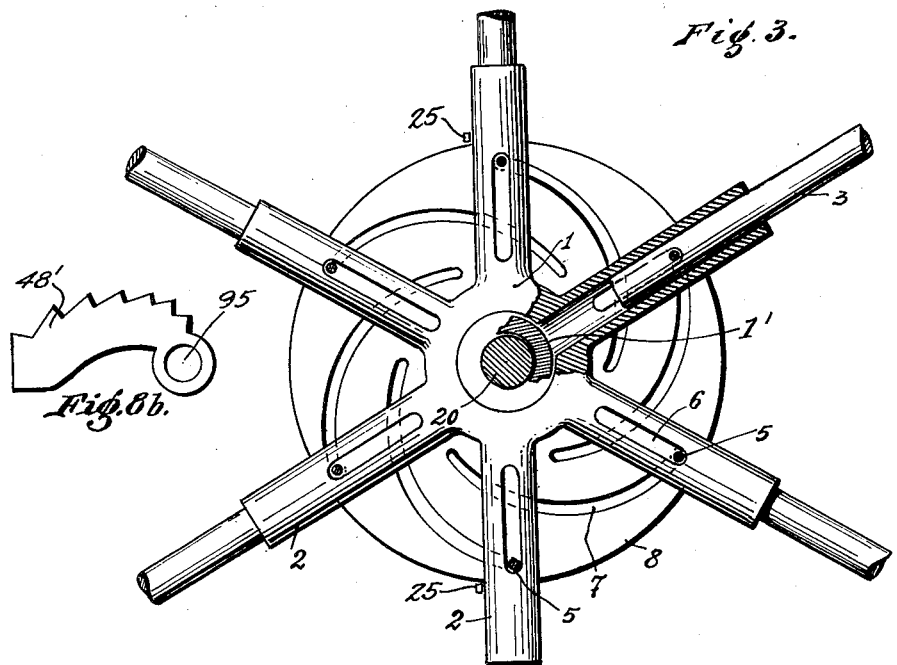
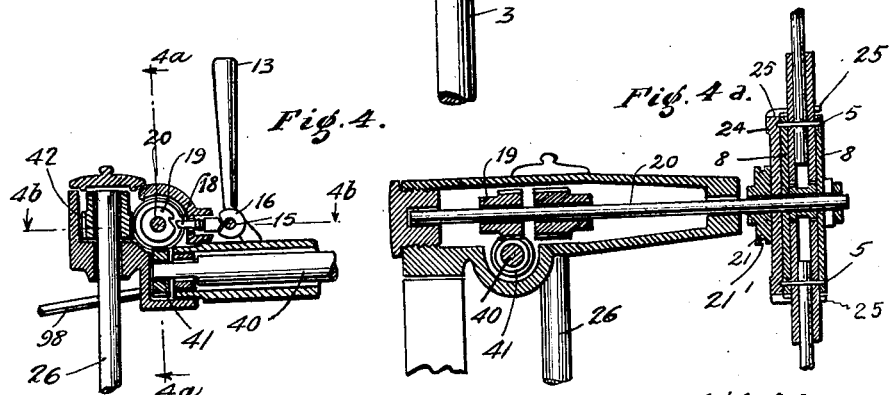
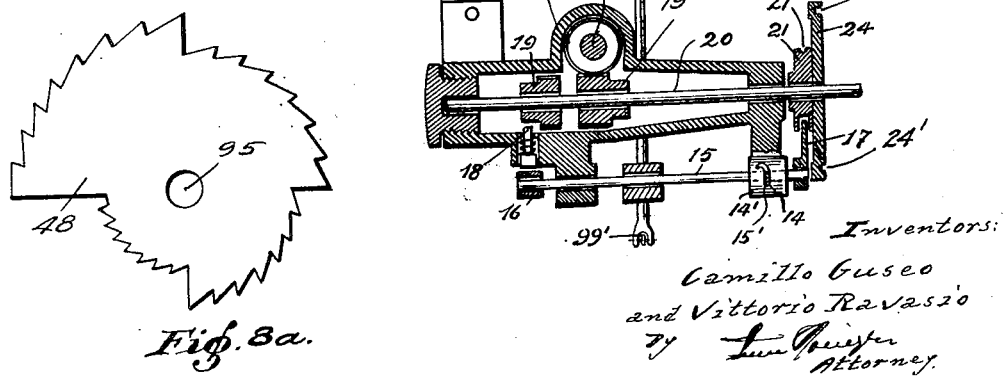

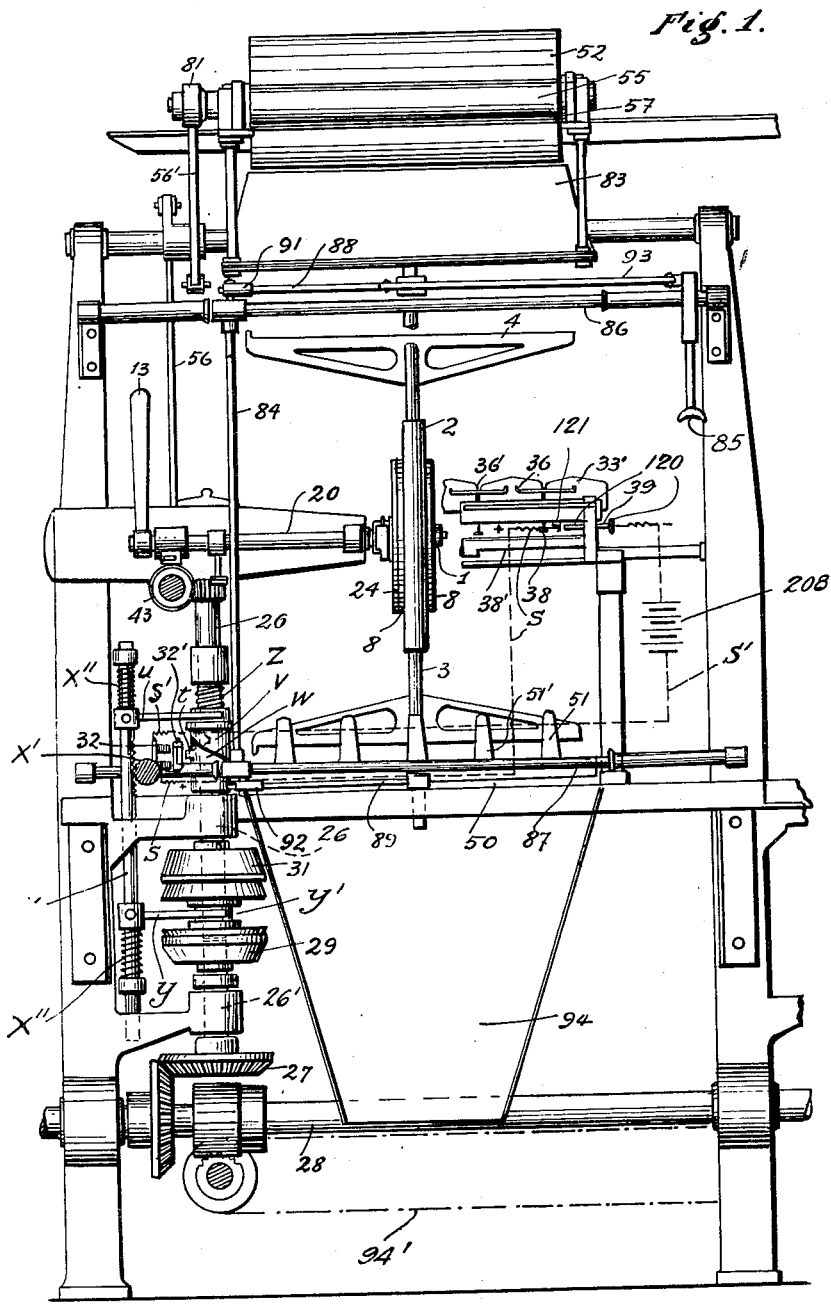

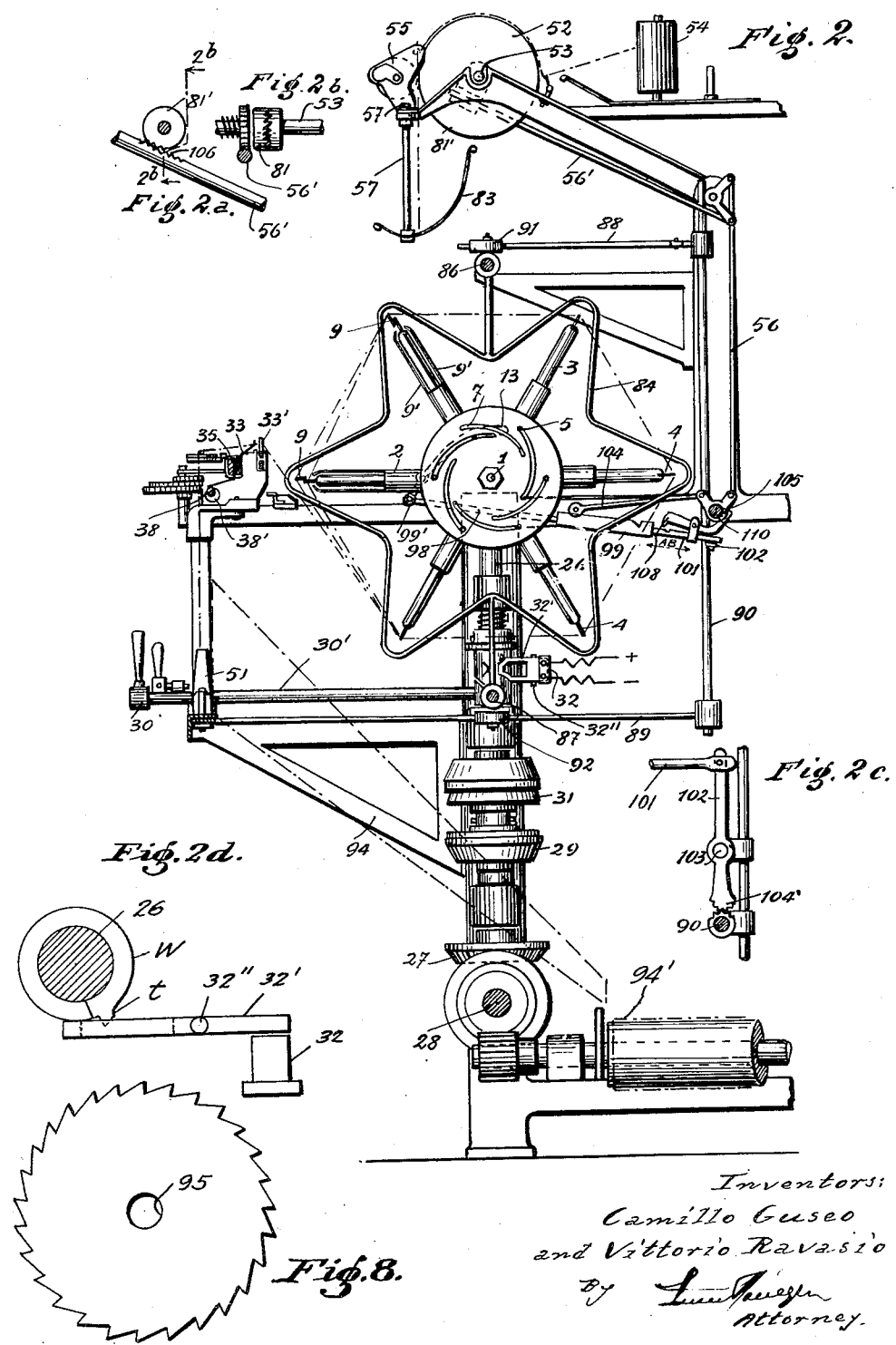

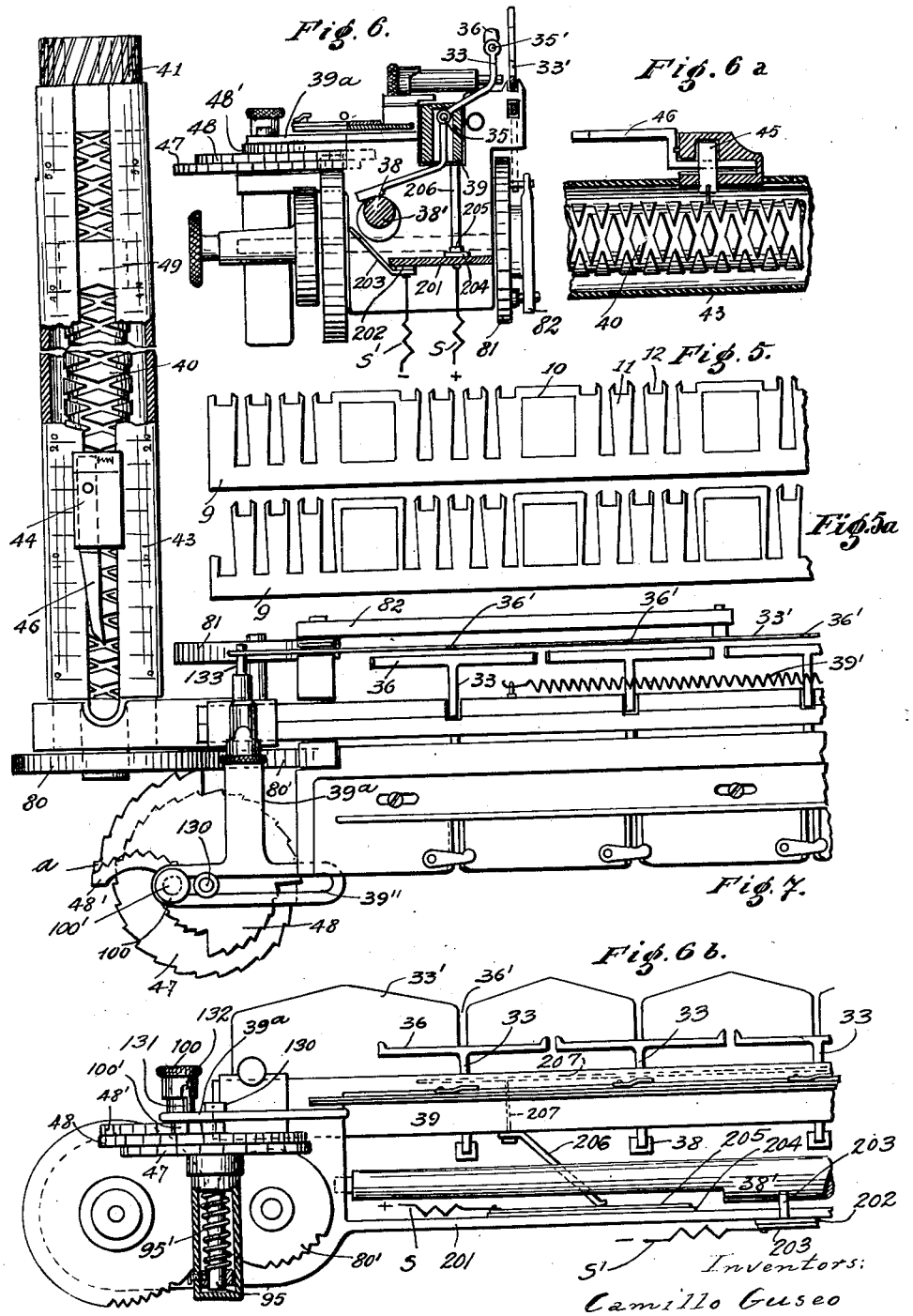

Patented July 23, 1935

2,009,177

UNITED STATES PATENT OFFICE 2,009,177

REEL FOR MAKING AUTOMATICALLY TIED UP OR CROSSED HANKS

Camillo Guseo and Vittorio Ravasio, Villanova Sul Clisi, Italy

Application February 8, 1933, Serial No. 655,850
In Italy February 17, 1932

8 Claims. (Cl. 242—53)

This invention relates to reels for automatically manufacturing tied-up or crossed hanks and has for its object the provision of a generally improved construction of reel for winding threads of cotton, silk and wool from spools, bobbin and the like so as to form them into hanks with a minimum of labor and an extremely simple control of the machine. The reel, in the construction hereinafter described, has only the capacity of five hanks, so as to maintain the number of spools which stand idle at each stoppage of the reel due to broken threads binding and removing skeins, within an economic limit. By this reduction in the number of hanks for each separate reel, a notable saving of time in working is obtained.

The reel according to the present invention is so constructed that the cross-bars of the reel on which the hank is wound are mounted expansibly on their respective spokes in such a manner that it is possible to control the simultaneous displacement, stoppage and release by means of a single lever. Two consecutive cross-bars are provided with combs so arranged that the teeth and spaces of one correspond to the spaces and teeth of the other in the sense of the periphery of the reel. The reel is equipped with automatically operating mechanisms for controlling the stoppage of the machine when any one of the threads from the group of spools breaks, and when the group of spools are completely emptied.

The stoppage, when the spools are completely emptied, is of particular interest for special classes of work. Automatic stoppage is also ensured when the hanks contain the desired length of thread.

In order to more fully describe the present invention, reference will be made to the accompanying drawings in which:

Figure 1 is a front view of the machine according to the present invention.

Fig. 2 is a side view thereof.

Fig. 2a is an enlarged detailed view of a device for the preparation of ties for binding the hanks.

Fig. 2b is a sectional view taken on line 2b—2b of Fig. 2a.

Fig. 2c is another detailed view of an element of the device for controlling the extractor.

Fig. 2d is a top view of the control magnet and armature.

Fig. 3 is a fragmentary elevational view partly in section of the reel.

Fig. 4 is an enlarged sectional view of the mechanism controlling the movement of the cross-bars of the reel.

Fig. 4a is a sectional view taken on line 4a—4a of Fig. 4.

Fig. 4b is a sectional view taken on line 4b—4b of Fig. 4.

Figs. 5 and 5a are elevational views of the combs adapted to be fixed on the bars of the reel.

Fig. 6 is a sectional view of the thread guides.

Fig. 6a is a fragmentary view partly in section of an indicator associated with the thread guide.

Fig. 6b is a partial sectional view of the thread guide.

Fig. 7 is a plan view of the thread guide.

Figs. 8, 8a and 8b are plan views of the associated rachet wheels.

As shown in Figs. 3 and 4a, the reel formed of metal comprises a hub 1 provided with six tubular radial arms 2. The hub 1 is loosely mounted on a bushing 1' carried by a shaft 20. Each of the tubular arms 2 has a spoke or rod 3 radially slidably mounted therein which supports a cross-bar 4 at its free end. Cross-bars 4 are fixed to rods 3 and extend parallel to shaft 20. Studs or pins 5 extend transversely through rods 3 and project through radial slots in the arms 2 to serve for preventing rotation of the rods during radial movement. Two guide discs 8 are fixedly mounted on shaft 20 and abut against the ends of bushing 1'. As shown in Fig. 3, the guide discs 8 are provided with six spiral guiding slots 7. These slots 7 are of identical formation and are symmetrically positioned about the center of the disc 8. The two guide discs are fixedly mounted on shaft 20 with the slots 7 of one disc in register with the corresponding slots of the other disc. The studs 5 projecting through the radial slots 6 of arms 2 also project through the slots 7 in guide discs 8. With this construction, it will be realized that relative rotation between the reel hub 1 and the discs 8 will produce radial movement of studs or pins 5 in slots 6 and consequently the rods 3 and the cross-bars 4 will be subjected to radial movement.

As shown in Fig. 4a, a brake disc 24 is loosely mounted on shaft 20 and is provided with an annular groove 24' on one face thereof adapted to receive the free ends of studs or pins 5. When the brake disc 24 is in a position to receive the studs 5, the studs, and consequently the rods 3 and cross-bars 4, will be locked against radial movement. The groove 24' is sufficiently spaced from the shaft 20 so that the rods 3 will be locked in their extended position. When the pins 5 are locked against radial movement by engagement with disc 24, the hub 1 is in effect locked to the discs 8 which, in turn, are fixedly mounted on shaft 20 and the reel will rotate with shaft 20. To retract rods 3, the brake disc 24 is shifted axially on shaft 20 away from the position shown in Fig. 4a, so that the pins 5 will be free to move radially in slots 6, whereupon shaft 20 with discs 8 are maintained stationary while the hub 1 is rotated. The relative rotation between discs 8 and hub 1 serves to produce the radial movement of rods 3.

The reel of the present invention, due to its rigidity, simplicity of its construction and from its reduced length, is able to withstand high velocities without vibration.

For reeling of tied-up hanks, the reel carries on two of its six cross-bars, two blades 9 (Figs. 5 and 5a) each of which has alternately smooth portions 10 and portions having a group of teeth 11. Each tooth is provided with a slot 12 formed in the top thereof. The number of portions with teeth corresponds to the number of hanks it is desired to make, while the number of teeth corresponds to the leas of which each hank is composed. The two blades 9 are fixed on the two cross-bars in such a manner that the teeth of one blade are opposite to the slots between the teeth in the other. The threads may thus be differentiated not only horizontally but also vertically insuring their alternate positions, the first thread collecting in the base of the slot of one of the two cross-bars and at the top of the tooth of the other cross-bar and vice versa for the second thread, and so on for the successive threads.

For special classes of work (with separate leas), in place of having two blades with combs placed on two consecutive bars, all six cross-bars 4 have combs superposed on them, which have the same characteristics as those already described. This arrangement allows the operator to rapidly insert the tie into the spaces thus resulting between the upper and lower leas of one cross-bar and to introduce it successively into the interspaces between leas of the second cross-bar, so that on the tie being knotted, that is, on the binding being twisted, the leas of the hank are perfectly separated by the ties passing around them. This binding, besides insuring a neat and precise separation of the leas, is much more rapid when compared to that at present in use and is less fatiguing to the operator.

The combs 9, which are fixed to the cross-bars 4 and which, in turn, are carried by the spokes or rods 3, may be reversed or over-turned for cross-reeling by revolving the spokes or rods through an angle of 180° about their axes. When the combs are moved radially toward the axis of shaft 20, they enter between two lateral guides 9' (Fig. 2) fixed to the hub so that the hanks resting on the guides can be easily removed.

The present invention embodies a mechanism controlled by a single lever for actuating the apparatus to effect retraction of the spokes or rods 3. For this purpose a small disc 21 is affixed to the brake disc 24. As will be described hereinafter, means are provided for engaging a groove 21' in the periphery of the disc 21 for shifting discs 21 and 24 axially out of engagement with pins or studs 5 and then imparting by means of discs 21 and 24 a rotary movement to the hub 1 relative to disc 8. As shown in Figs. 4, 4a and 4b, shaft 20 has affixed thereon two gear wheels 19 and 19'. Motion is transmitted to the shaft 20 by means of gear wheel 19' which meshes with a worm wheel 42 mounted on shaft 26 which is driven by suitable driving mechanism to be described hereinafter. A shaft 40 extending at right angles to both shafts 20 and 26 is provided with a gear wheel 41 which meshes with the gear 19. In addition, gear wheel 19 is provided with a collar-like projection having a notch formed in the circumferential surface thereof.

To effect the retraction of the spokes 3, means are provided for locking shaft 20 against rotation, shifting disc 24 out of engagement with the studs or pins 5 and for imparting rotation to disc 24 which, in turn, is transferred to the hub 1. This means comprises a shaft 15 mounted parallel to shaft 20 and adapted for both rotary and axial movement. A lever 13 is mounted on one end of shaft 15 and is provided with a cam surface adapted to cooperate with a pin 18 which is movable into and out of the notch provided on the circumferential surface of gear 19. With this mechanism, it is possible by shifting lever 13 to move pin 18 into the notch on the surface of gear 19 and thereby lock shaft 20 against rotation. A portion of shaft 15 extends through a support 14' which is provided with a helical key-way 14 cooperating with a pin 15' carried by shaft 15 to transfer rotary motion of the shaft 15 into axial movement thereof. With this mechanism, it is possible to effect the axial displacement of the disc 24 on shaft 20. For this purpose, the shaft 15 has a sector 17 fitted thereon which has a toothed portion engaging in the groove 21' formed on the periphery of the disc 21. Upon shifting the lever 13 to rotate shaft 15, the pin 18 is moved into engagement with the gear wheel 19 and due to the cooperation between the key-way 14 and pin 15', shaft 15, together with sector 17, is shifted axially. The axial displacement of the sector 17 effects a corresponding axial displacement of the discs 21 and 24 and serves to move the latter out of engagement with studs 5. Groove 21' is provided with teeth which cooperate with the toothed sector 17. Further rotation of the shaft 15 by lever 13 will, due to the toothed connection between sector 17 and disc 21, effect rotation of the disc 24. The rotary movement of disc 24 is transferred to the hub 1 and the associated arms 2 by means of fork-like members 25 diametrically carried by the disc 24.

From the foregoing description, it will be realized that the operation of the lever 13 serves first to lock shaft 20 and the guide discs 8 carried thereby against rotation. Further movement of lever 13 serves to move the brake disc 24 axially out of engagement with the pins 5 and still further movement produces rotation of the hub 1 and associated arms 2. The rotation of the hub 1 causes the pins 5 to travel through the spiral slots 7 provided in the guide discs 8 and consequently the rods 3 are moved to retracted position. With the rods 3 in the retracted position, the hanks wound upon the combs 9 and cross-bars 4 can be easily removed therefrom.

To expand the rods 3, it is only necessary to return the lever 13 to its initial position. During the travel of the lever to its initial position, the hub 1 and associated arms 2 are rotated relatively to the disc 8 so that the pins 5 are moved to the outer extremities of the spiral slots 7. Then the disc 24 is moved into engagement with the pins 5 to lock them in extended positions and finally the pin 18 is moved out of engagement with the gear 19 so as to permit free movement of shaft 20.

The reel is capable of being quickly and easily reduced in perimeter according to the needs of special works.

The reel in question is driven by a vertical shaft 26 divided into two parts. The lower part 26' is connected through two beveled gears 27 to a lower horizontal main shaft 28 which serves for a series of reels united in one machine, varying in length according to the number of reels composing it. The upper part of the vertical shaft is connected with and operated by the lower part, always in rotation, by means of a friction clutch 29 actuated by a control lever 30. Above, there is a friction brake 31 actuated by the same lever 30, by which, when the friction clutch 29 is applied, the brake 31 is released, and vice versa.

The lever 30 is carried by a spindle 30' provided with gear teeth $x'$ at one end meshing with rack teeth on a sliding rod $x$ (Fig. 1) axially displaceable in vertical guides against the action of springs $x''$ in both directions. The sliding rod $x$ is provided with two forks $u$ and $y$, of which the fork $y$ extends into an annular groove formed in a rotatable cylindrical member connecting the shiftable element of the clutch 29 with the shiftable element of the brake 31. The shiftable elements of clutch 29 and brake 31 are splined to shaft 26 for axial slidable movement thereon. Clutch 29 has its shiftable portion affixed to shaft 26' which is aligned with shaft 26. The non-shiftable element of brake 31 is fixed against rotation, so that when the shiftable element is brought into contact therewith the shaft 26 will be stopped. Rotation of the spindle 30' by the lever 30 moves the sliding rod $x$ in one or the other direction and simultaneously disconnects the drive of the machine through the clutch 29 and applies the brake 31, or vice versa. In addition to the control lever 30, the reel may be stopped in case of any of the threads breaking and also at the completion of each stage of work, by means of an electromagnet 32 associated with two balanced thread guides 33 (Figs. 6, 6a and 7).

An armature 32' is associated with electromagnet 32. As shown in Figs. 2 and 2d, the armature is rockably mounted on a fixed vertical pin 32'', so that when the magnet is energized the armature 32' will be rocked about the pin 32'' in a clockwise direction (Fig. 2d) to bring the nose thereof into engagement with lug $t$ on bush $w$.

When the electromagnet is energized, as hereinafter described, the armature 32' thereof is moved into the path of rotation of a projecting lug $t$ on a bush $w$ freely rotatable on the shaft 26 and the upper end of which is provided with a helical cam surface coacting with a counter helical cam surface provided upon a second bush $v$. The bush $v$ is slidably keyed to the shaft 26 and is urged against the bush $w$ by a spring $z$. The stoppage of the lug $t$ and bush $w$ by the armature 32' of the magnet causes the bush $v$ to rise up the shaft 26 by virtue of the action of the helical cam surfaces and the said bush moves the fork $u$ with which it engages and so moves the rod $x$ to disconnect the clutch and apply the brake 31.

The thread guides 33 are formed of shaped or bent rods pivotally mounted near their mid-portions at 35 upon a movable balance guide-carrying member 39 and the upper ends 36 of the guides 33 are of rectangular-like form and are disposed parallel to a second guide rod 33' hereinafter described, while the lower ends 38 of the guide rods 33 function as counter-weights. The thread is arranged to enter a slot 36' on the guide rod 33' and passes over and presses upon the upper end 36 of the guide 33 and the tension of the thread causes the guide to be moved about its pivot 35, thus raising the counter-weights 38 from a cylinder 38' and thereby interrupting the circuit of the magnet 32. If a thread breaks, the ensuing movement of the guide 33 re-establishes the circuit of the magnet 32 which is arranged automatically to disengage the clutch 29 and apply the brake 31. In certain cases, if desired, all the ends 36 of the guide 33 may be connected together by a rod 35' so that the breakage of one or more threads does not cause a stoppage of the machine, it being necessary for all the threads to be broken or all the bobbins emptied before all the counter-weights 38 can be lowered to effect an actuation of the magnet 32. The cylinder 38' in this case may be formed eccentric as shown in Fig. 6, so that it may be rotated and only the central counter-weight 38 enabled to make contact therewith.

As shown in Figs. 6 and 6b, a horizontal shelf 201 is provided on which is mounted a strip of insulating material 202 which supports a brush 203 contacting with cylinder 38' which is suitably insulated and with which the weight 38 is adapted to contact. Shelf 201 also supports an insulating strip 204 carrying a conducting strip 205. A brush 206 is carried by the sliding bar 39 and is moved along the strip 205. Suitable conductors 207 connect brush 206 with the thread guides 33. As shown in Figs. 1, 6 and 6b, magnet 32 is connected by wires $s$ and $s'$ with brush 203 and conducting strip 205, a battery 208 being included in the circuit. Upon contacting of weight 38 with cylinder 38', the circuit will be completed and the magnet 32 energized.

Bar 39 is also provided with a contact member 121 adapted to engage screw 120 (Fig. 1) at the end of its travel to complete the circuit through wires $s$ and $s'$ to energize magnet 32.

For the purpose of stopping the reel at the end of each stage of work when a predetermined length of thread has been wound, a balance thread guide-carrying rod 39 is provided which is arranged to be displaced in steps by the working operation in a manner which will now be described and which, on the completion of the displacement, closes by contact the above-mentioned circuit.

The number of threads and the consequent length of thread wound on the reel for each skein or hank is regulated by another device which will be termed the counter (Figs. 6, 6a and 7).

The counter is composed of a horizontal shaft 40 with a double crossed thread channel, carrying at one extremity a gear wheel 41 which receives movement from the vertical shaft 26, as described in connection with Figs. 4, 4a and 4b.

The worm counter is protected by a graduated tube 43, open at the top so as to provide a space in which runs a small carrier 44 moved by shaft 40 by means of a fork 45 (Fig. 6a) having a flexible point which, travelling along the crossed channel, imparts a to and fro movement to the carrier 44. On its upper side, the carrier has a finger 46 which, upon moving away from and back toward a toothed ratchet wheel 47, engages the latter moving it around by one cog or step. The ratchet wheel 47 (Fig. 8) is fixed on a shaft 95 (Fig. 6b) which has a spring 95' associated therewith, tending to rotate the shaft and disc 47 in a clockwise direction, as viewed in Fig. 7. On the upper surface of ratchet wheel 47 there is mounted a ratchet toothed wheel 48 (Fig. 8a) also affixed to shaft 95. A third ratchet wheel or segment 48' (Fig. 8b) is mounted on top of wheel 48 and is also affixed to shaft 95. Thus, the three ratchet wheels 47, 48 and 48' are all affixed to shaft 95 and move therewith as a unit. The step-by-step movement imparted to wheel 47 by finger 46 will be transmitted through shaft 95 to wheels 48 and 48' which cooperate with spring 39' to impart a step-by-step movement to the bar 39. Spring 39' is fixed at one end to the bar 39 and at its other end to the machine frame in order that the bar 39 may be moved when the ratchet 46 of the counter resting on the toothed wheel 47 moves the sector 48 on which it is fixed. Bar 39 may be connected at will with either of the two ratchet wheels 48 and 48', according to the class of work desired.

Bar 39 has an angular extension 39a which is provided with a slot 39" associated with a pivot 130 formed on the upper end of shaft 95 and about which the bar 39 slides. In the angular extension of bar 39, there is an axially sliding bolt 100' provided with a knob 100. The bolt 100' may be adjusted axially to two positions by means of the pin 131 cooperating with the knob 100 and a groove 132 formed in the latter. When bolt 100' is in the position shown in Fig. 6b, the free end of the bolt engages the teeth of toothed sector 48' and for each movement of toothed wheel 47 sector 48' is moved, permitting lateral movement of bar 39 under the action of spring 39'. Thus, the bar undergoes the successive displacement necessary for the formation of tied hanks in which the thread, during the rotation of the reel, is guided in the projections and grooves of blades 9.

When bolt 100' is in the position shown in Fig. 6, the free end thereof engages with sector 48 only and bar 39 accomplishes the four lateral displacements necessary for the formation of crossed hanks, corresponding to the four steps a of the sector 48. Also, the end of bar 39 is contacted with screw 120 for stopping the reel.

For the crossed reeling, the machine should be stopped at the end of the reeling when the hanks have obtained one of the four lengths characteristic in this operation and precisely after 560, 1120, 1680 or 2240 rotations. In the case of 560 rotations, the course of the indicator is such that the support 44 arrives at the end of a course corresponding to 80 rotations of the reel and effects by means of its ratchet the advancement of wheel 47 a distance equal to one tooth. The wheel 48 is thus moved a corresponding distance, but since the first six teeth of wheel 48 are spaced the same radial distance from the center thereof no movement of bar 39 is effected by the engagement of pin 100 with these teeth. However, when wheels 47 and 48 are advanced another tooth (7th tooth), the pin 100 moves to the second quadrant of wheel 48 which is of smaller diameter and the bar 39 is shifted a distance equal to the difference in the radii of the two quadrants. Upon being shifted, the bar 39 engages with an electrical contact provided on the end of a regulable screw 120 (see Fig. 1) which serves to stop the machine. If the number of rotations should be 1120, 1680 or 2240, the screw 120 will be adjusted to stop the machine only when the pin 100 passes from the second, third or fourth quadrant of wheel 48.

For tied hanks, the bar 39 should be displaced in correspondence to each advancement of the wheel 48' (course of departure and return of support 44) to permit the disposition of threads in the combs (Fig. 5). For this purpose the wheel 48' has small regular gradients in correspondence to each of which the bar 39 is moved to stop the machine when the combs are full of thread.

When the operator, at the end of each stage of work, replaced the guide bar 39 in its normal position against the action of spring 39', the group of ratchet wheels are also carried back to their normal position, due to spring 95'.

The run of the carrier, according to the various exigencies of length of leas, may be varied by the simple movement and fixing in position of a ring 49 by means of a screw. This can be easily fixed in any position on the screw-threaded shaft and thus determine the desired length and duration of the run. To obtain a rapid and exact movement of this stop-ring, the above-mentioned protecting tube 43 is graduated.

What has been said in the foregoing applies especially to so-called tied-up working, but on the same winder cross-working may also be done. For this purpose the reel is furnished with a second guide 33' already mentioned. A rapid to-and-fro movement is imparted to guide 33' by shaft 40 through an attachment of two gears 80 and 80' which work an eccentric 81 operating by a connecting rod 82 (Fig. 6). Guide 33' may be disengaged from connecting rod 82 by means of pivot 133 and rigidly united to bar 39 for obtaining a single displaceable unit for formation of tied hanks. The automatic stoppage of the reel, at the end of a stage of work, is also insured for this class of work, by means of the electric device, already described, attached to the counter.

The bobbin-carrying frame 50 is placed below the thread-guide bar and therefore the thread is fed to the machine, according to the present invention, from below upwards—that is, from bobbin (or cop) 51, 51' across the thread-guide rod 33 to the reel (Fig. 2). This arrangement insures an easy winding, avoids useless breakages of thread, and enables the operator to change bobbins easily.

Finally, with the object of facilitating the work of the operator in tying up the hanks, a device is placed above the reel which furnishes him, ready to hand, at the time of the closing and opening of the reel, with the necessary length of tie for the operation of tying.

The device (Figs. 1, 2, 2a, 2b) is composed of a drum 52 mounted on a shaft 55 and over which pass the ties coming from spools 54 placed behind it. The passage of the ties is insured by pressure of a roller 55. The diameter of the drum is about 14 cm. (i. e., about 45 cm. in circumference) so that one revolution of the drum causes the passage of 45 cm. of binding material necessary for tying. The rotation of the drum is effected by drawbars 56, 56' hereinafter described more in detail. The free pinion or one-way clutch 81' mounted on the same axle as drum 52 and engaging in the toothed rack 106 at the extremity of rod 56' allows the free return of the rod itself to its normal position. The tie, which is fed by the drum in readiness for use, falls onto a concave plate 83 placed below. At the opportune moment, it is detached by the operator with a slight, almost imperceptible, movement which causes the thread to be cut against a blade 57' fixed to a rod 57 placed below the drum. The above-described device for delivering the ties may be substituted by a simple device connected with shaft 26 and working automatically, but always dependent on the manipulation of lever 13. This simple device makes a decided improvement in binding, and, besides, relieves the operator from the fatigue of binding material in tangled masses which, at present, is continually being placed before him.

To take off the hanks, when finished, from the reel, a device called an extractor has been devised which, connected with lever 13 for manipulating the reel, causes the discharge of the hanks at the time of closing and opening the reel, and of feeding the tie by means of the displacement of the aforesaid lever. This device consists of a "crown" in the shape of a star 84 which surrounds the reel and runs, at the time of closing the reel, on two guides 86, 87, nearly touches the cross-bars of the reel, and pushes the hank onto a rotatable arm 85. The to-and-fro movement of this star or extractor is obtained in the following manner: The star 84 is connected by two joints 91, 92 (Figs. 1 and 2) with two levers 88, 89 (Figs. 1 and 2) fixed on shaft 90 (Fig. 2). The operator manipulating the lever 13 makes them turn forward through about a third of a complete turn. During this rotation, the draw bar 98, which carries tube 99, runs back on account of the joint 99' traversing the space A—B. In the meantime, the movement occurs of closing the reel, as already described. The joint or articulation 99' connects the handle 13 with the draw bar 98, which carries the tube 99. On rotation of the said handle, the draw bar 98 runs back and, naturally, also the tube 99, which is fixed on it and which traverses the space A—B.

The space A—B being travelled and the closing of the reel naturally being completed, the tube 99, which has been completely superimposed over shaft 101, arrives against the horizontal arm 102 pivotally mounted at 103 on the bar provided at the middle of the machine which forms a part of the frame of the machine (see Fig. 2c) and pushes it back. By this push, teeth 104' situated at the extremity of arm 102 cause the vertical shaft 90 to turn. This last, in its turn, causes the rotation and the movement of the extractor through the already-described bars 88, 89 and joints 91, 92. Draw bar 93 is pivoted at 93' (Fig. 1) to bar 88, which is moved by shaft 90. Rotation of the small shaft 90 moves draw bar 93, and the jointed arm 85 is rotated thereby placing it in position to receive the hanks, i. e., about 90° to the position it has in Fig. 1. The draw bar 98, when moving back, drags also with it the draw bar 104 which, through joint 105 of draw bars 56, 56' and free pinion or one-way clutch 81', carries the toothed rack 106 into its normal position. Replacing lever 13 in its starting position, the same movements repeat themselves in a reversed direction—that is:

The draw bar 98 with tube 99 runs forward drawing behind it catch 108 which entered during the previous movement in notch 109. The catch, following the course of the aforesaid draw bar, makes arm 102 turn and causes the extractor to make the return movement. At the same time the jointed arm 85 completes a quarter of a turn, being carried back to the normal direction of work. When the turned extremity of catch 108 meets the shaft 110, the catch is detached from notch 109 (Fig. 2). Draw bar 98 then continues on its course while the reel re-opens and the draw bars 104, 56 and 56' act on the drum for feeding ties 52, causing it to release and prepare a new piece of tie. The work of gathering the empty bobbins has been simplified in the new machine, since they are discharged through the medium of an inclined sheet-iron hopper 94 onto an endless belt 94' and are conveyed to a receiver, box or basket, placed at the head of the machine.

Apart from the notably improved production secured by the new machine, it is to be noted that all the principal members thereof requiring the greatest manual labor on the part of the operator are placed within convenient reach, so as to secure a comfortable position of work for the operator and to avoid any useless fatigue.

The constructive details might vary according to necessity, without departing from the scope of the present invention.

We claim as our invention:

1. A reel mechanism comprising a shaft, a hub, a plurality of radial tubular arms mounted on said hub, a plurality of rods slidably mounted in said tubular arms for extensible and retractible movement, cross-bars on which hanks are adapted to be wound each mounted on one of said rods, a transverse stud on each rod projecting laterally through a radial slot formed in each tubular arm, a guide disc positioned on each side of said hub and fixed to the shaft, said guide discs having corresponding spiral slots formed therein for receiving and guiding the studs of said rods, means for locking said rods in their expanded position comprising a brake disc freely mounted on said shaft adjacent one of said guide discs and provided with an annular recess in one face thereof for receiving the studs of said rods, and a single control device operable for axially shifting said brake disc to lock or release said studs and for rotating said arms and rods about the axis of the hub to cause radial displacement of the rods by virtue of movement of the studs in the spiral slots in said guide discs.

2. A reel mechanism comprising a shaft, a hub a plurality of radial tubular arms mounted on said hub, a plurality of rods slidably mounted in said tubular arms for extensible and retractible movement, cross-bars on which hanks are adapted to be wound each mounted on one of said rods, a transverse stud on each rod projecting laterally through a radial slot formed in each tubular arm, a guide disc positioned on each side of said hub and fixed to the shaft, said guide discs having corresponding spiral slots formed therein for receiving and guiding the studs of said rods, means for locking said rods in their expanded position comprising a brake disc freely mounted on said shaft adjacent one of said guide discs and provided with an annular recess in one face thereof for receiving the studs of said rods, and a single control device operable for axially shifting said brake disc to lock said studs and for rotating said arms and rods about the axis of the hub to cause radial displacement of the rods by virtue of movement of the studs in the spiral slots in said guide discs, said single control device comprising a control shaft, a lever for shifting said control shaft, a spiral slot device for effecting simultaneous axial and rotary movement of said control shaft, a grooved disc associated with said brake disc, means on one end of said control shaft for engaging said grooved disc to effect axial and rotary movement of the brake and grooved discs, fork means on said aforementioned disc for imparting rotation thereof to said reel, and means associated with the other end of the control shaft for locking said reel shaft against rotation.

3. A reel mechanism comprising a series of radially extensible and retractible spokes, cross-bars on which hanks are adapted to be wound and which are each mounted on one of said series of radially extensible and retractible spokes of the reel, a locking device for locking the spokes in the extended position, a single control operatively connected to the spokes and locking device in such a manner as to effect with one operation a release of the locking device and retraction of the cross-bars when contracting the reel and, when expanding the reel, an extension of the cross-bars into the working position and an actuation of the locking device to lock the bars in such position, and combs provided on two consecutive cross-bars of the reel and arranged so that the teeth and spaces of one are disposed opposite the spaces and teeth of the other in the axial direction of the reel.

4. In an automatic reeling machine, a reel, a drive shaft for rotating said reel, a power shaft, a clutch for coupling said driving shaft to said power shaft, a brake associated with said drive shaft, mechanical means for simultaneously actuating said clutch and brake to render the brake effective and the clutch ineffective, electromagnetic means for actuating the mechanical means and means responsive to a break in a thread supplied to the reel for energizing said electromagnetic means.

5. In an automatic reeling machine, a reel, a drive shaft for rotating said reel, a power shaft, a clutch for coupling said driving shaft to said power shaft, a brake associated with said drive shaft, means for simultaneously applying said brake and releasing said clutch comprising a sleeve slidably keyed to said drive shaft for actuating said brake and clutch operating means, said sleeve having a cam formed on one end thereof, a second sleeve loosely mounted on said drive shaft and having a cam adapted to cooperate with the cam on the slidable sleeve, resilient means urging the slidable sleeve against the second sleeve, and means controlled by the breakage or termination of thread supplied to said reel for stopping the rotation of said second sleeve to cause the sliding sleeve to shift the brake and clutch operating means to stop the drive shaft.

6. A reel mechanism comprising a reel, means for driving the reel, a clutch and brake for disconnecting the reel from the driving means and stopping the reel, mechanical means for actuating the clutch and brake, electromagnetic means for controlling the mechanical means, means for stopping the reel after the completion of the winding of a given number of turns of thread thereon comprising a cross-threaded shaft driven in timed relation to said reel, a follower associated with said cross-threaded shaft adapted to be alternately moved in opposite directions axially of said shaft, a ratchet wheel, a ratchet carried by the follower for moving the ratchet wheel a notch upon the completion of a reciprocation of said follower, a stepped wheel driven by said ratchet wheel, and a switch, for completing an electric circuit including said electromagnetic means, having an element following said stepped wheel and adapted to close the switch upon passage over a step on said wheel.

7. A reel mechanism comprising a series of radially extensible and retractible spokes, cross-bars on which hanks are adapted to be wound and which are each mounted on one of said series of radially extensible and retractible spokes of the reel, a locking device for locking the spokes in the extended position, a single control operatively connected to the spokes and locking device in such a manner as to effect with one operation a release of the locking device and retraction of the cross-bars when contracting the reel and, when expanding the reel, an extension of the cross-bars into the working position and an actuation of the locking device to lock the bars in such position, a device for supplying ties for the hanks wound on said reel comprising a drum having a diameter corresponding to the length of tying thread, means associated with said single control for rotating said drum, and means for severing the tying thread after the unwinding of a definite length thereof.

8. A reel mechanism comprising a series of radially extensible and retractible spokes, cross-bars on which hanks are adapted to be wound and which are each mounted on one of said series of radially extensible and retractible spokes of the reel, a locking device for locking the spokes in the extended position, a single control operatively connected to the spokes and locking device in such a manner as to effect with one operation a release of the locking device and retraction of the cross-bars when contracting the reel and, when expanding the reel, an extension of the cross-bars into the working position and an actuation of the locking device to lock the bars in such position, a device for removing hanks from the reel comprising a star-shaped crown, guides parallel to the cross-bars of the reel for the movement of said crown, and means operable by said single control for alternately positioning the crown in a position to receive hanks and in a position to permit the operator to remove the hanks.

CAMILLO GUSEO.
VITTORIO RAVASIO.